H. G. GEISSINGER.
ELECTRIC CONTACT THERMOSTAT.
APPLICATION FILED JAN. 19, 1918.
1,315,603.  Patented Sept. 9, 1919.
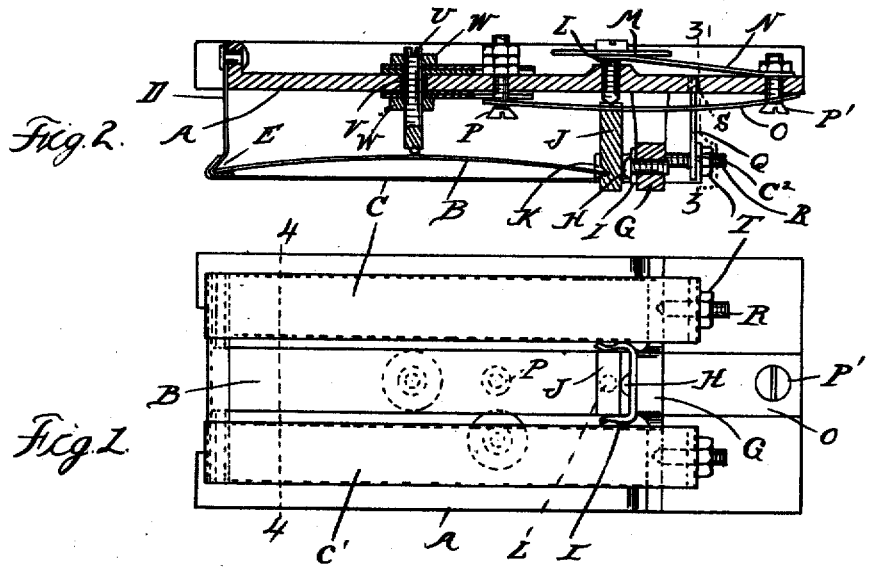
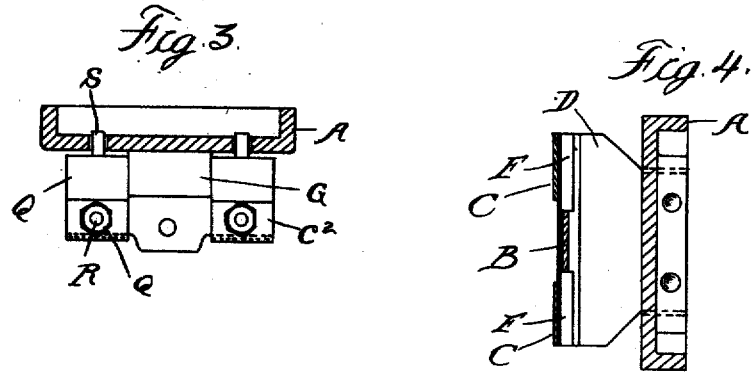
Inventor
Harry G. Geissinger
By Whittemore Hulbert & Whittemore
Attorneys

UNITED STATES PATENT OFFICE.

HARRY G. GEISSINGER, OF NEW YORK, N. Y., ASSIGNOR TO THE PEOPLES STATE BANK, TRUSTEE, OF DETROIT, MICHIGAN, A CORPORATION OF MICHIGAN.

ELECTRIC-CONTACT THERMOSTAT.

1,315,603.  Specification of Letters Patent.  Patented Sept. 9, 1919.

Application filed January 19, 1918. Serial No. 212,806.

*To all whom it may concern:*

Be it known that I, HARRY G. GEISSINGER, a citizen of the United States of America, residing at New York, in the county of New York and State of New York, have invented certain new and useful Improvements in Electric-Contact Thermostats, of which the following is a specification, reference being had therein to the accompanying drawings.

The invention relates to electric contact thermostats of the type in which the circuit is opened and closed by the lateral movement of an arch element in coöperation with one or more chord elements having a differential coefficient of expansion. It is the object of the invention to obtain a simple construction in which the arch element may be adjusted toward or from the coöperating electrical contact bearing without disturbing the relative adjustment between the arch element and the chord element which determines the curvature of the arch. The invention also has reference to various specific features of construction as hereinafter set forth.

In the drawings:

Figure 1 is a side elevation of the instrument;

Fig. 2 is a horizontal longitudinal section therethrough;

Fig. 3 is a cross-section on line 3—3 Fig. 2;

Fig. 4 is a cross-section on line 4—4 Fig. 1.

A is a suitable base or mounting, B is the arch element and C and C' the chord elements on opposite sides of the arch element and in substantially the same plane. At one end of the elements B C C' is arranged a flexible link D for suspending the elements from the base while permitting movement thereof in their common plane. This suspension link has formed at its free end a V-shaped groove E forming a bearing for the end of the arch element, and to hold said element from lateral displacement stops F are placed in the groove on opposite sides thereof, being secured by solder or other suitable means. At the opposite end of the elements B C C' is arranged a lug G depending from the base A and forming an anchorage for the elements. At the center of this lug is a point bearing, preferably formed by the rounded head of a screw or rivet H, which may also be employed for holding a U-shaped clip I. This clip is adapted to embrace a block J which is provided with a V-shaped groove K forming a bearing for the end of the arch element, while the opposite side of the block bears against the point H. The block J is adjustable in a plane perpendicular to the plane of the elements by means of a screw L passing through the base and engaging a notch in the end of the block. M is a disk or wheel secured to the screw L to form a means for rotatively adjusting the same, N is a spring brake bearing on the disk to hold the same from accidental adjustment and O is a bowed spring centrally engaging the block J and having its ends notched to engage the heads of screws P and P' on the base, the arrangement being such that the spring O will maintain the block in contact with the adjusting screw F in all positions of adjustment.

The ends of the elements C and C' adjacent to the lug G are adjustably connected thereto, preferably by bending an inwardly-extending flange $C^2$ on each of said elements which is adjacent to a nut member Q engaging an adjusting screw R, the end of which engages a nut bearing in the lug G. The nut member Q is held from rotation by extending to the base, being provided with a tongue S engaging an aperture in the base. There is also provided a lock nut T engaging the screw R and holding the same from accidental adjustment.

U is the electrical contact for coöperating with the arch element to close the electric circuit, said element U passing through an insulator sleeve V in the base and being threaded to engage lock nuts W on opposite sides thereof to hold it in the desired position of adjustment.

The construction being as described to set the instrument, the screws R may be adjusted by turning in the member Q so as to either draw upon or release the ends of the chord elements C and C'. The end of the arch element being longitudinally fixed in position by engaging the block J, it is evident that any adjustment of the chord members C and C' will vary the curvature of the arch. When the proper adjustment is made in this respect the space between the arch element and the contact member U may be varied by the lateral adjustment of the block J through the medium of the screw L. This adjustment is effected without in any way altering the curvature of the arch, as the movement of the block is perpendicular to the plane of the elements. Furthermore the fact that the block J abuts against the point bearing H permits the block to aline itself with the end of the arch element to maintain a proper bearing therefor. Each of the chord elements is also positioned by the point bearing of the screw R upon the lug G, and the member Q being free to rock on the tongue S will exert a uniform stress on all portions of the cross-section of the chord.

By reason of these various features of construction the instrument when once adjusted will not be affected by jar or vibration or any influence other than temperature change.

What I claim as my invention is:

1. In an electric contact thermostat, the combination with a base, of coöperating arch and chord elements arranged in substantially the same plane, means connecting one end of said arch and chord elements in fixed relation to each other but adjustable in the plane thereof in relation to said base, a bearing for said arch element having a fixed position on said base longitudinally of said elements, means for adjusting said bearing transversely of the plane of said elements, means for adjusting the end of the chord element in relation to the base, and means for effecting opening and closing of a circuit by deflection of said arch element.

2. In an electric contact thermostat, the combination with a base, of coöperating arch and chord elements arranged in substantially the same plane, means for connecting said arch and chord elements at one end thereof in fixed relation to each other but adjustable in the plane thereof in relation to said base, a bearing for the opposite end of said arch element in fixed position longitudinally of the plane of said elements but adjustable transversely of said plane, means for adjusting said bearing transversely of the plane of said elements and means for adjusting the adjacent end of said chord element longitudinally of the plane thereof, and means for effecting opening and closing of a circuit by deflection of said arch element.

3. In an electric contact thermostat, the combination with the base, of coöperating arch and chord elements arranged in substantially the same plane, a fixed bearing on said base, a bearing block in contact with said fixed bearing and forming a bearing for one end of said arch element, means for adjusting said bearing block on said fixed bearing transversely of the plane of said elements, a connection between the opposite end of said arch element and adjacent end of said chord element, an adjustable connection between the end of said chord element adjacent to said fixed bearing and said base, and means for effecting opening and closing of a circuit by deflection of said arch element.

4. In an electric contact thermostat, the combination with the base, of coöperating arch and chord elements arranged in substantially the same plane, a lug projecting from said base having a point contact centrally thereof, a block bearing against said point contact and having a bearing for one end of said arch element, a connection between the opposite end of said arch and adjacent end of said chord element, an adjustable connection between the end of said chord element adjacent to said fixed bearing and the projecting lug on said base, and means adjustable on said base transversely of the plane of said elements bearing against said block to move the same on said point contact, and means for effecting opening and closing of a circuit by deflection of said arch element.

5. In an electric contact thermostat, the combination with the base, of coöperating arch and chord elements arranged in substantially the same plane, a lug projecting from said base adjacent to one end of said elements and having a centrally arranged point contact, a block forming a bearing for one end of the arch element, said block being in contact with said point bearing, means for adjusting said block on said point bearing transversely of the plane of said elements, a connection between the opposite end of said arch element and adjacent ends of said chord elements, flexible connecting means between said connection and the base to prevent movement of said elements in the plane thereof, members attached to the opposite ends of said chord elements and extending to said base, and screws engaging said members and bearing against said lug adjustable to move said chord elements in the plane thereof, and means for effecting opening and closing of a circuit by deflection of said arch element.

6. In an electric contact thermostat, the combination with a base, of a pair of chord elements and an arch element between the chord elements, a fixed bearing on said base, means for suspending corresponding ends of said elements in fixed relation to each other adjustable longitudinally of said elements and substantially in the plane thereof, a bearing for the other end of said arch element having a fixed position on said base longitudinally of said element, and means for independently adjusting the ends of the chord elements adjacent to said fixed end of the arch element.

In testimony whereof I affix my signature.

HARRY G. GEISSINGER.

Copies of this patent may be obtained for five cents each, by addressing the "Commissioner of Patents, Washington, D. C."